United States Patent [19]

Duncan

[11] Patent Number: 4,933,807

[45] Date of Patent: Jun. 12, 1990

[54] METHOD OF AND APPARATUS FOR IMPROVED CAPACITIVE DISPLACEMENT AND PRESSURE SENSING INCLUDING FOR ELECTRONIC MUSICAL INSTRUMENTS

[75] Inventor: Donald A. Duncan, Cambridge, Mass.

[73] Assignee: Key Concepts, Inc., Woburn, Mass.

[21] Appl. No.: 397,766

[22] Filed: Aug. 23, 1989

[51] Int. Cl.[5] .......................... G10H 1/02; H01G 7/00

[52] U.S. Cl. ........................................ 361/283; 84/688

[58] Field of Search ....................... 84/1.06, 1.24, 1.25; 361/280, 283

[56] References Cited

U.S. PATENT DOCUMENTS 4,498,365 2/1985 Tripp et al. .......................... 84/1.24

*Primary Examiner*—Donald A. Griffin

*Attorney, Agent, or Firm*—Rines and Rines, Shapiro and Shapiro

[57] ABSTRACT

A capacitive pressure-sensitive and displacement-sensitive sensor apparatus and method in which first electrode means comprising a thin resilient conductive inclined or arcuate plastic sheet having a plurality of resilient projections protruding from the inner surface of the sheet and with said projections pressure-deformable by application of pressure thereat from the outer surface of the sheet cooperates with a second relatively flat electrode facing and coextensive with the projections and separated from the same by a thin dielectric layer therebetween, the first electrode extending inclinedly or arcuately over the second electrode such that when force is applied to the resilient first electrode along said outer surface thereof, as by a portion of means such as a keyboard key contacting the same, it approaches the second electrode and dielectric layer through air in a fashion which causes the resilient deformable projections along the inclined or arcuate inner surface thereof to contact said dielectric layer sequentially in a predictable order.

21 Claims, 9 Drawing Sheets

Figure 1A:
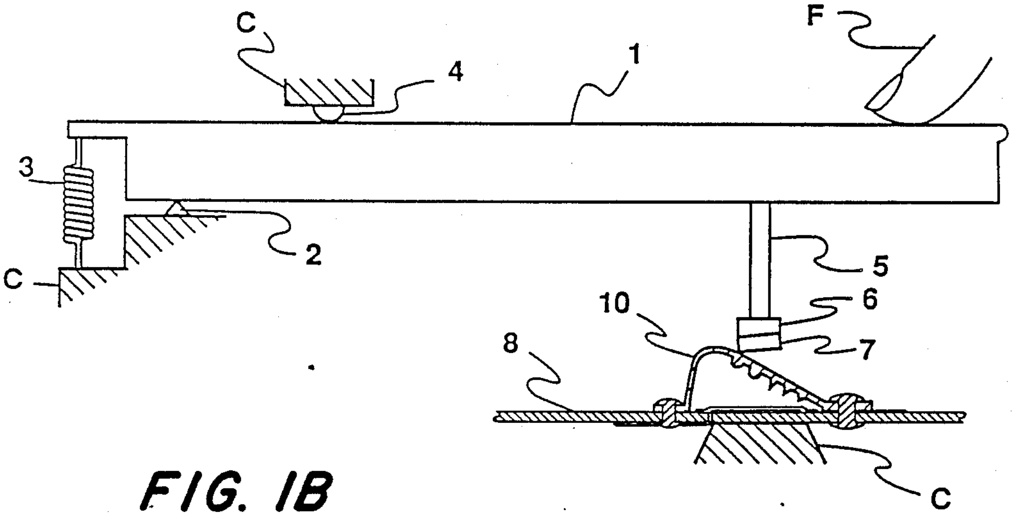

METHOD OF AND APPARATUS FOR IMPROVED CAPACITIVE DISPLACEMENT AND PRESSURE SENSING INCLUDING FOR ELECTRONIC MUSICAL INSTRUMENTS

The present invention relates to novel variable capacitive displacement and pressure sensing methods and apparatus particularly, but not exclusively, applicable to keyboards for electronic musical instruments.

Considering the application of such sensors to the illustrative application in electronic keyboard musical instruments, it is desirable to be able to control one or more parameters of the musical sound by how hard or how fast a key is struck by the player. It is further desirable to be able to independently control different parameters of the sound by how hard each key is pressed after it is down, often referred to as "polyphonic pressure sensitivity." The system or systems used for determining force during keystrike and pressure on the key afterward must allow certain dynamic mechanical characteristics so that the keyboard responds in a predictable and controllable fashion, provides certain tactile feedback to the player, and allows long term playing without producing excessive player fatigue.

Current technology for determining how hard a key on a musical keyboard is struck primarily incorporates one of two systems. The first uses a pair of switches, one of which indicates that the key is being depressed and the other of which indicates that the key is near the bottom of its stroke. The time elapsing between the engagement or disengagement of the two switches is used to determine how fast the key is being depressed. This system does not provide information on how hard the key is held down after depression.

The second system, described in U.S. Pat. No. 4,498,365, assigned to Key Concepts, Inc., uses a variable capacitor, one electrode of which is affixed to the key and the other electrode of which is mounted to the chassis of the instrument. Further, one electrode is resilient and deformable in such a fashion as to produce a change in contact area corresponding to the force applied to the key. The rigid electrode is covered by a material of high dielectric constant. Functionally, this system has two dielectrics: the material which covers the rigid electrode and the air which separates the two electrodes when they are not in contact.

In this system, the capacitance of the capacitor is continuously monitored. With the key at rest, the capacitance has a rest value. As the key is depressed, the electrode attached to the key moves through the air closer to the fixed electrode, and the capacitance rises. When the two electrodes contact with the layer of higher dielectric material between them, the distance between the electrodes becomes effectively fixed, but the capacitance continues to rise as the deformable electrode absorbs the momentum of the key, increasing the electrode area in contact with the dielectric layer until the momentum is fully absorbed. At this point, the capacitance begins to fall. From the peak value of the capacitance, the momentum of the key can be inferred, and is translated by appropriate hardware and software into electrical signals which are a musically useful representation of the effort put into the key strike. Additionally, this system can provide information on how hard the key is held down after depression.

This second system has a number of advantages over the double switch system. Virtually all implementations of either system use multiplexing to sequentially scan the key sensors, and for a given scan rate, the peak detection method is inherently more accurate. Also, the availability of a continuous signal representative of key position allows both attack (key down) and release (key up) threshholds, i.e. the point in its downward travel where a key is determined to have been depressed and the point in its upward travel at which the key is determined to have been released, to be adjusted both by the manufacturer and by the user. In the dual switch system, the positions of the switches set these two points irrevocably. Further, the continuous signal of the capacitive system allows the use of time as well as momentum by measuring the elapsed time between the capacitive signal increasing a certain amount over the rest value and the achievement of peak capacitance, and the points measured can be farther apart in the key strike than with the dual switches. Lastly, the resilient deformable electrode capacitive system can continue to provide information on how hard each key is being depressed after the initial strike (polyphonic pressure) for continuous control of musical parameters.

While the system described in U.S. Pat. No. 4,498,365 thus represents a significant improvement in the art, there are applications where it has certain limitations including complexity of manufacturability and thus expense. The system requires a capacitive electrode mounted on each key and, as a result, an electrical connection to each key, with both the electrode and the connection requiring a construction which does not interfere unduly with the normal motion and feel of the key.

Figure 3A:
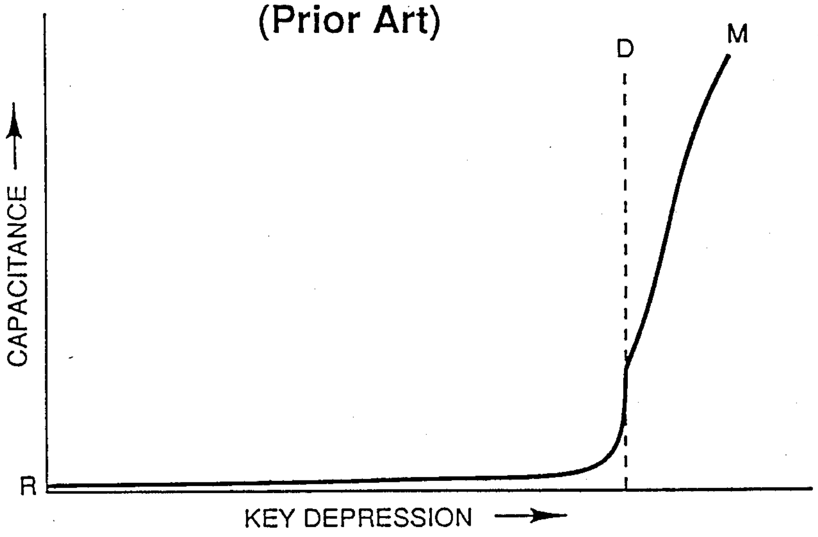
FIG. 3A (Prior Art)

There are also certain performance limitations, later described. FIG. 3A shows the output of such a capacitor versus distance as a key descends to the point of contact of the moveable electrode with the dielectric layer, indicated by a dotted line D, and then beyond. Because air has a relatively low dielectric constant, and because capacitance varies inversely as the distance, the rise in capacitance is quite slow at first, then accelerates dramatically as the electrode mounted on the key approaches the fixed electrode. The result is that most of the signal change occurs over a small portion of the key travel near the bottom of the stroke. This imposes severe limits both on the adjustability of attack and release threshholds and on the highest point in the key's upward travel which can be reliably detected. The functional consequences of this for a keyboard player are the potential for double strikes if a key is played lightly and bounces off the keybed, inadvertently releasing a note by not holding a key continuously against the keybed, and "premature" cessation of notes (relative to other keyboards) when playing slowly and expressively.

While not always critical, the feel of the system when the key strikes bottom is also of concern. Keyboards have traditionally used wool felt to absorb impact when the keys strike the keybed, and the felts are specially chosen to limit the travel of the key after impact, to minimize rebound of the key, and to provide a firm and predictable keybed for the player. Implementations of the system described in U.S. Pat. No. 4,498,365, to the extent that the resilient electrode is capable of transducing forces covering the normal range of keyboard strikes and yet recovering quickly in order to faithfully track changes in holddown force, can produce significant rebound which some players can find tiring. When felts or other absorbent materials are introduced behind either of the electrodes, the range of travel after "contact" increases, the peak value of the capacitive signal falls proportional to the amount of momentum absorbed by the felt, and the keybed loses crispness, which can be distracting to the player.

It is a principal object of the present invention to provide generally a novel variable capacitive sensor which is capable of transducing both displacement and pressure with a greater and more linear capacitive signal increase during displacement than is achievable from a simple capacitive element in air.

It is another object of the present invention to incorporate this improved sensing into a keyboard for an electronic musical instrument to provide novel and improved performance characteristics which combine superior range, adjustability, and improved keyboard feel to that available using existing technologies and, indeed, obviate the above-described limitations thereof.

A further object of the present invention is to provide such a keyboard and sensing system which is simple and economical to manufacture.

Other and further objects and advantages of the invention will be explained hereinafter and will be more particularly delineated in the appended claims.

In summary, however, from one of its aspects, the invention embraces a capacitive displacement-sensitive and pressure-sensitive sensor having, in combination, a first electrode comprising a thin resilient conductive inclined or arcuate plastic sheet having a plurality of resilient projections protruding from the inner surface of the sheet and with said projections pressure-deformable by application of pressure thereat from the outer surface of the sheet, a second relatively flat electrode facing and coextensive with the projections and separated from the same by a thin dielectric layer therebetween, the first electrode extending inclinedly or arcuately over the second electrode such that when force is applied to the resilient first electrode along said outer surface thereof, as by a portion of a keyboard key contacting the same, it approaches the second electrode and dielectric layer through air in a fashion which causes the resilient deformable projections along the inclined or arcuate inner surface thereof to contact said dielectric layer sequentially in a predictable order, and such that upon release of said force, the resilient first electrode returns to its original position, with said deformable projections also retreating sequentially in a predictable order. Preferred and best mode embodiments and components, including a keyboard instrument for playing electronic music, are hereinafter described in detail.

Figure 4:
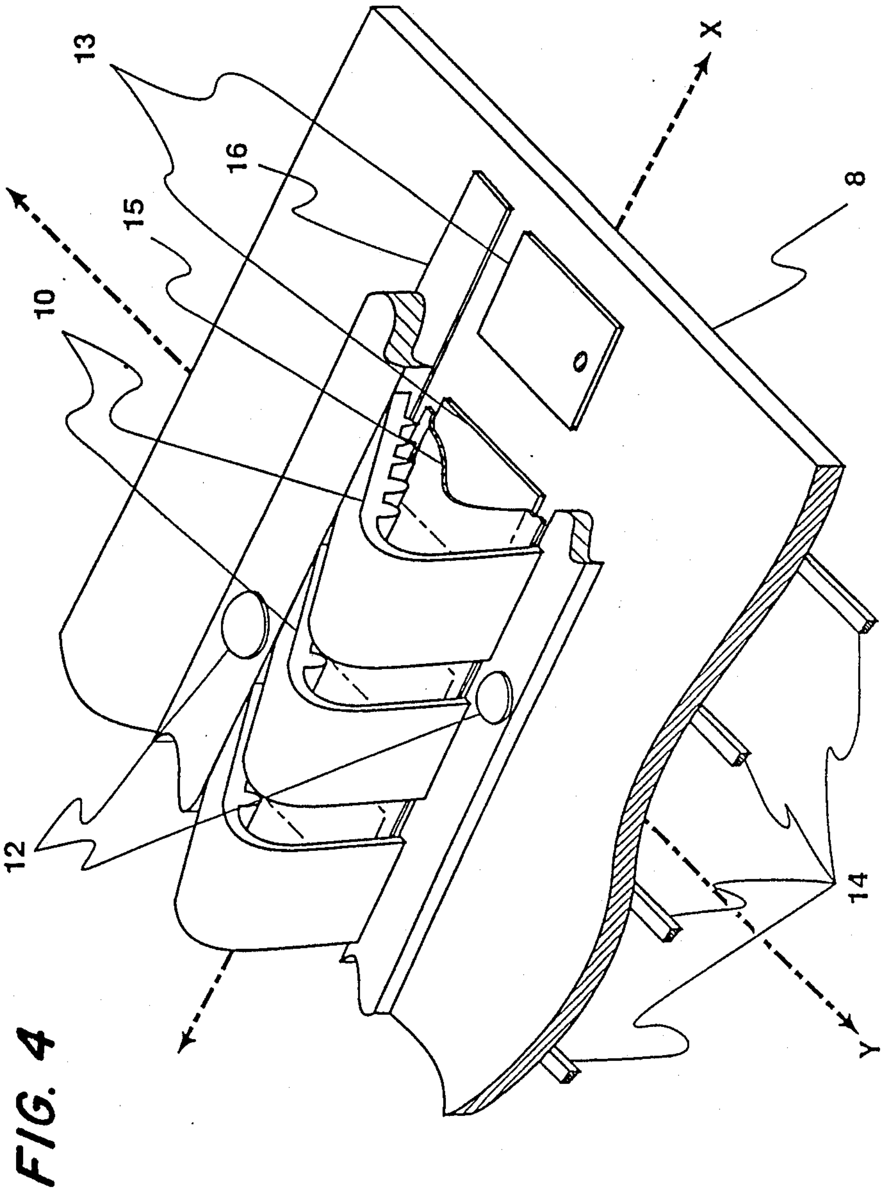
Figure 6A:
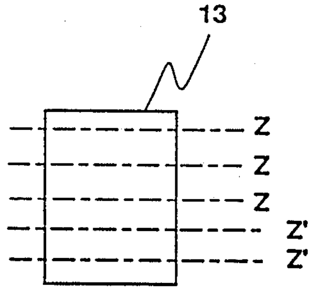
Figure 6B:
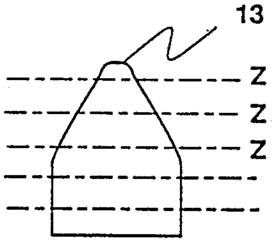
Figure 6C:
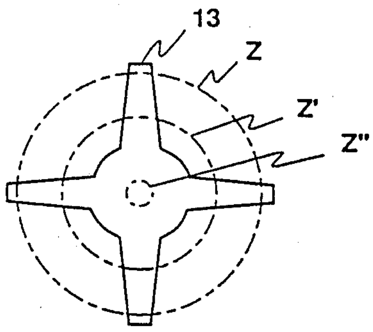

The invention will now be described with reference to the accompanying drawings, FIG. 1A of which is a transverse view of a keyboard mechanism incorporating the invention, FIG. 1B of which is an enlarged transverse section of the sensor mechanism, and FIG. 1C of which is a projected view from below showing the configuration of the deformable projections;

FIGS. 2A–D are transverse sectional views of the sensor showing the action as the key is depressed;

FIGS. 3A, B, and D are experimentally derived plots of capacitance versus key displacement showing the improved detection of displacement over previous designs and demonstrating the results of varying the design; FIG. 3C is an experimentally derived plot of capacitance versus time for a typical keystrike;

FIG. 4 is an isometric view, partially cut away, of a mechanism incorporating a plurality of sensors in a single assembly;

FIGS. 5A–H are transverse sections and projections of alternate sensor configurations which can be used for different performance characteristics and alternate actuation mechanisms;

FIGS. 6A–C are alternate fixed electrode designs which may be used to vary capacitance during the actuation of a given deformable electrode design.

Figure 7A:
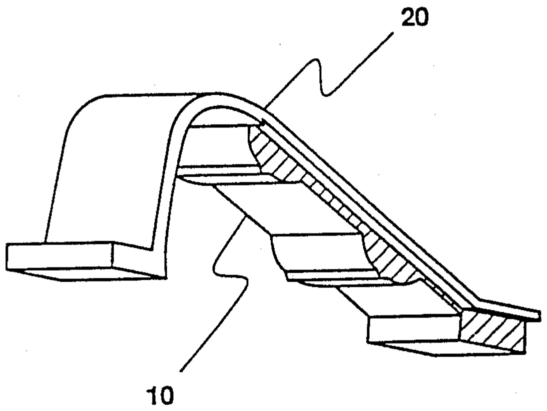
Figure 7B:
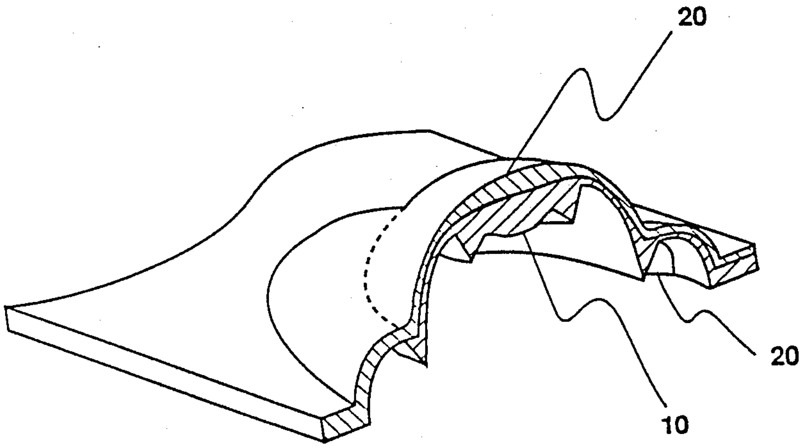

FIGS. 7A and B are sectioned projections of alternate designs in which a second material is used to support the first electrode of the sensor.

Referring to FIG. 1A, a key 1 of a keyboard is supported by a fulcrum 2. A tension spring 3, attached at one end to the key 1 and at the other end to the chassis C, supplies a counter-clockwise rotating force which holds the key against a stop 4 mounted to the chassis C when the key 1 is in the rest position. Depending from the key 1 is an actuator post 5 at the end of which is an actuator surface 6 which is in turn covered with an actuator felt 7 or similar resilient material. The actuator felt 7 is near or in contact with the resilient first electrode 10 of the sensor assembly, which is carried on a printed wiring board 8, which is in turn supported by and fastened to the chassis C.

When the operator presses with a finger F on the key 1, the key rotates clockwise around the fulcrum 2, moving the actuator assembly 5, 6, and 7 downward. The actuator felt 7 pushes downward on the outer surface of an inclined or arcuate deformable first electrode 10 of the sensor assembly of the invention, forcing it toward the printed wiring board 8. As the key 1 is depressed, it angles below the horizontal, and therefore the actuator surface 6 is itself angled such that when the key is fully depressed, the actuating surface becomes parallel to the printed wiring board 8. When the key 1 is released, the spring 3 causes it to return to the rest position shown.

Figure 1B:
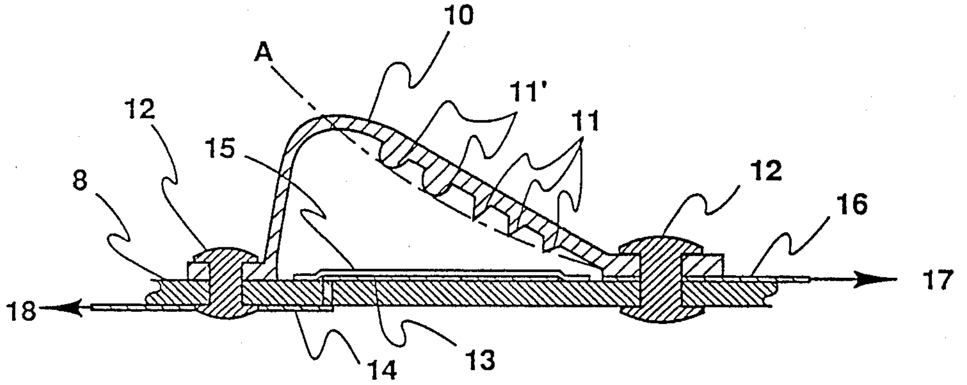
Figure 1C:
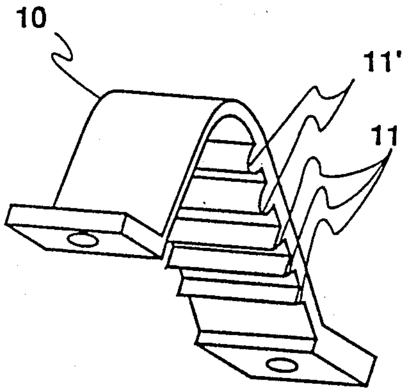

The details of the sensor assembly incorporating the before-mentioned deformable first electrode 10 are more fully shown in FIGS. 1B and 1C. On the lower or inner surface of the inclined or arcuate surface of the electrode 10 are a plurality of resilient and deformable projections 11 and 11'. In this embodiment the deformable projections 11 and 11' take the form of parallel ridges depending from the underside of a sheet of resilient material, and the three projections 11 are illustratively shown in the form of triangular ridges while two projections 11' are approximately half cylinders. It can further be seen that the height of the deformable projections above the sheet conforms generally to an arc A, the reason for which will become apparent in subsequent discussion. The deformable electrode 10 is affixed to the printed wiring board 8 by fasteners such as rivets 12 such that the portion of the deformable electrode 10 which incorporates the projections 11 and 11' is supported at an incline to or arcuately over a rigid fixed substantially flat second electrode 13 with their adjacent peripheral edge regions mechanically connected. Covering the fixed electrode 13 at all points between the first and second electrodes is a high dielectric material 15 such as adhesive-backed polyimide film. The resilient conductive first electrode 10 is held by a rivet 12 in contact with a conductive surface 16 which is in turn connected to circuitry 17 which supplies an AC signal, for example a 100 kilohertz sine wave, to said first electrode. The second fixed electrode 13 is connected through the printed wiring board to a conductor 14 which is in turn connected to circuitry 18 which, by detecting the amplitude of said AC signal present at the second electrode 13, determines the capacitance of the system and produces a signal corresponding to that capacitance which can be used to control musical parameters of an appropriate sound engine.

Figure 2A:
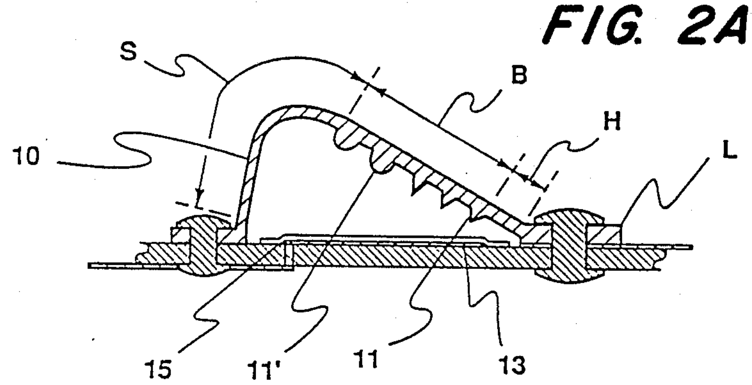

FIG. 2A shows the several parts of the deformable electrode 10. The portion indicated S functions as a spring, holding the electrode in its elevated position and providing the force required to return it to that position when the key is released. The portion marked B is the bearing surface, consisting of a backing portion and the deformable projections 11 and 11', and corresponding to the surface area of the fixed electrode 13. The portion marked H functions as a hinge as the bearing surface pivots downward during key depression. The flat portion marked L locates and anchors the deformable electrode 10 and provides the contact surface. The anchor section L is thinner than the combined web and projections of the bearing surface B in order to insure some bearing force on the deformable projections 11 and 11' when they come into contact with the dielectric 15.

Figure 2B:
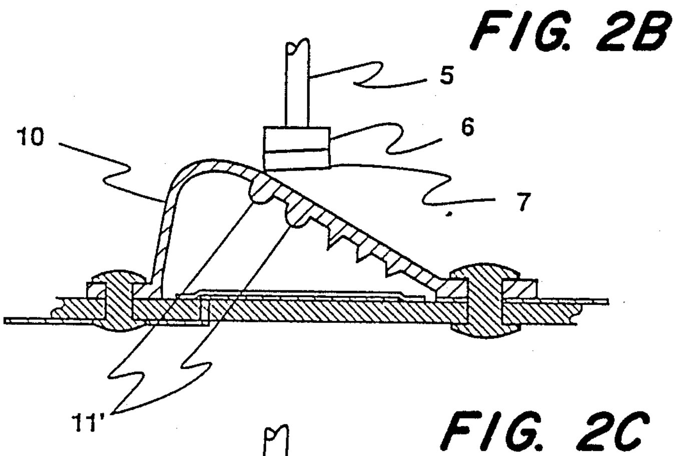

FIG. 2B shows the electrode assembly and the actuator assembly 5, 6, 7 in the rest position, before key depression. The actuator is positioned so that when fully depressed, it will bear on the portion of the upper surface of the deformable electrode 10 below which extend the hemicylindrical deformable ridges 11'.

Figure 2C:
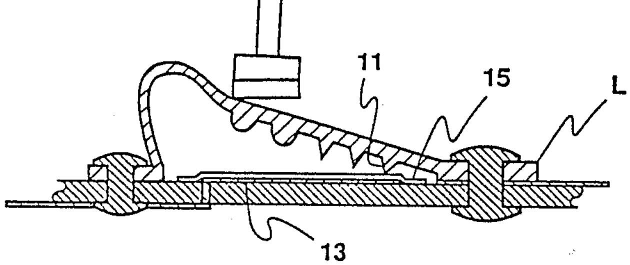
Figure 2D:
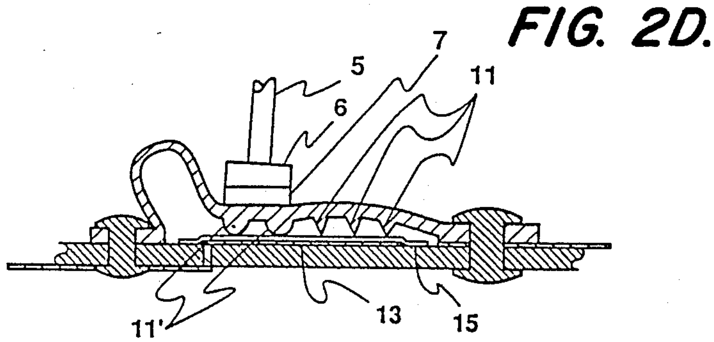

FIG. 2C shows the position of the actuator and electrode assemblies when the key is partially depressed. The thickness differential between the deformable projection 11 and the anchor section L of the deformable electrode 10 in conjunction with the incline of the deformable electrode 10 insures that the deformable projection 11 closest to the anchor L is the first portion of the deformable electrode 10 to contact the dielectric film 15. Continued depression of the key will cause each of the deformable projections 11 and 11' to contact the dielectric sequentially until the position in FIG. 2D is achieved. This is the point at which the player feels resistance and assumes that the bottom of the key stroke has been reached. As yet, however, although the capacitance has increased significantly, only a small area of the deformable electrode 10 is actually in contact with the dielectric 15. Additional force on the key will compress the deformable projections 11', increasing the area in contact with the high dielectric film 15, further increasing the capacitance of the assembly and providing a measure of the force with which the key is held down.

The use of the arc A, FIG. 1B, to establish the lengths of the deformable projections 11 and 11' insures that when the bearing surface B, FIG. 2A, begins to pivot on the first deformable projection 11 in contact with the dielectric 15, FIG. 2C, the remainder of the deformable projections 11 and 11' will contact the dielectric 15 in turn rather than all at once, and that when the deformable electrode 10 is in full contact with the dielectric 15, FIG. 2D, there will be some tension in the deformable electrode bearing surface B to hold the deformable projections 11 in position against rocking forces when the actuator assembly 5, 6, 7 further compresses the deformable projections 11'.

Further examination of FIG. 2D shows the reason for the preferred two different cross-sections of the deformable projections 11 and 11'. When the deformable electrode 10 is fully down against the dielectric 15, the effects of distance on capacitance become minimal, and the primary contributor to additional capacitance increase becomes the amount of area of the deformable projections 11 and 11' in contact with the dielectric. A triangular projection, such as 11, will have lower capacitance when in contact with the dielectric than a rounded projection such as 11', both because the portion which is in direct contact is limited and because the area-distance product of the elements of its surface is considerably less. However, for the same reason the amount of area increase in contact with the dielectric for a given distance of compression of the projection is considerably less for the triangular projections 11 than for the rounded projections 11'. Inspection of FIG. 2D shows that when the key is further depressed and the actuator assembly 5, 6, 7 compresses the hemicylindrical deformable projections 11', they will contribute a much higher percentage of the total area of the deformable electrode 10 in contact with the dielectric 15 than will the triangular projections 11, insuring that a useful amount of capacitive change is available for the measurement of both key momentum during key strike and pressure after the key is down, and producing that amount of capacitive change with a minimal amount of additional vertical travel of the key.

This ability to transduce the forces involved in keyboard playing in a relatively shallow distance allows the interposition of felt 7 between the actuator surface 6 and the outer surface of the deformable electrode 10. The felt softens the keybed for the player, making it feel more natural. It absorbs impact, broadening the peak capacitance resulting from a key strike and making it more easily tracked by the electronics, but it also transmits force through to the deformable electrode 10, allowing momentum and pressure measurement. The result is that when the player feels the key move downwards "into" the keybed during application of pressure, the amount of movement is divided between compression of the felt 6 and compression of the deformable projections 11', and the ratio of compression of the two materials can be adjusted in the design by selection of felt Characteristics, felt thickness, and actuator area, and by varying the material, number, and shape of the deformable projections under the actuator.

Before-mentioned FIG. 3A shows an experimentally derived curve of capacitance versus key depression for a version of the system described in U.S. Pat. No. 4,498,365, and provides an example of the expected change in capacitance as a single electrode moves from its rest position (capacitance R) through air to contact the second electrode (separated by the dielectric layer) at the dotted line D, as previously explained. Most of the capacitance change of such a system during key depression occurs just prior to contact between the electrodes. Subsequent additional force on the key after contact produces a continued rise in capacitance through increase in area in contact with the dielectric as a result of deformation of one electrode. The maximum value M will normally be established by mechanical characteristics of the keyboard in combination with limits set in the electronic circuitry.

Figure 3B:
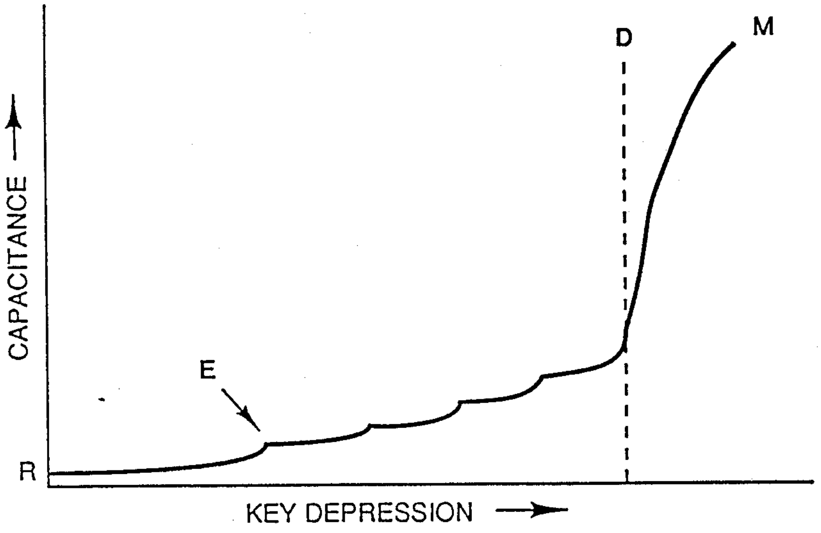
Figure 3C:
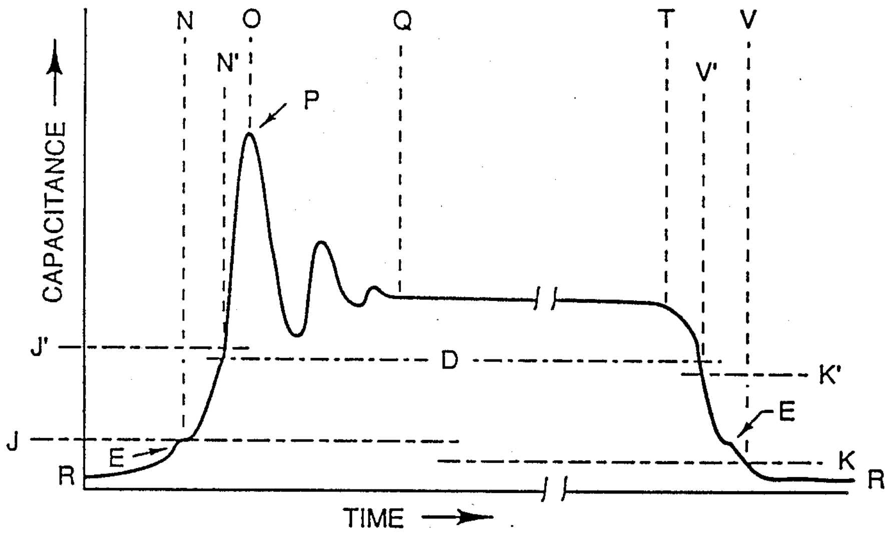
Figure 3D:
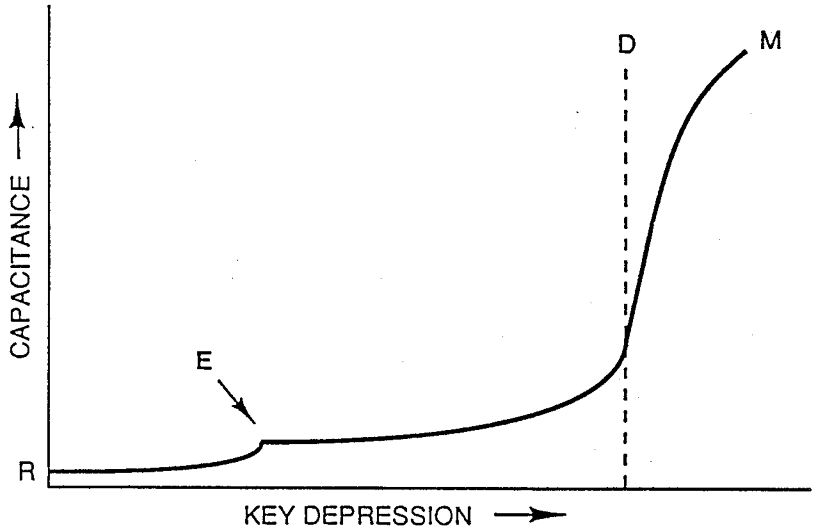

FIG. 3B shows the equivalent curve for the improved system of the present invention just described. Since capacitance is a function both of area and of separation, the system shown in FIGS. 2A–D has a higher rest capacitance R than a system with an electrode attached to the key. The inclined position of the deformable electrode 10 also causes the capacitance to rise more quickly as the key is depressed, since portions of the electrode approach the dielectric 15 well before the key reaches bottom. The point at which the first deformable projection 11 contacts the dielectric 15, FIG. 2C, is identified by the letter E. The ratio of the capacitance at E compared to the initial or rest capacitance R insures a repeatable and detectable threshhold for determining that a key is being depressed as well as, when the capacitance is falling, that a key is being released.

From the point of initial contact E, in the position of FIG. 2C, to the point of full contact D, in the position of FIG. 2D, the capacitance rises steadily as more of the deformable electrode 10 approaches the dielectric 15, and the remainder of the deformable projections 11 and 11' contact the dielectric 15 in sequence. The result is an approximately linear relationship between key depression and capacitance from R to D, FIG. 3B, which allows adjustability in the selection of attack and release points within the key stroke and eliminates double strikes and inadvertent releases.

FIG. 3C shows a plot of capacitance versus time for a normal key strike. As the key is accelerated downward from its rest position, the capacitance climbs from its rest value R through the initial contact E to full contact at D. The impact of the key striking bottom causes continued compression of the deformable projections 11'; the resultant increase in area of the deformable electrode 10 in contact with the dielectric 15 causes the capacitance to continue to rise until the momentum of the key has been absorbed at the signal peak P, and capacitance begins to fall. During this rise, the capacitance surpasses a preset attack threshhold J at time N, which is an indication to the appropriate circuitry that the key is being depressed. The circuitry monitors the capacitive signal until it ceases to rise and begins to fall at time 0; the peak value P of the capacitance is converted to a signal proportional to the momentum of the key, and digital signals are forwarded to the sound generator which turn on the appropriate note and provide a "velocity" parameter, representative of how hard the key was struck, to control characteristics of the sound such as volume. The time between N and O is inversely proportional to the hardness of the key strike, and may be used in conjunction with or instead of the peak value to determine the "velocity" parameter.

After the initial peak P, the capacitance typically oscillates as shown, principally as a result of compliance and rebound in the components of the keyboard and sensor assembly, and partially due to compliance in the human finger. To allow the system to settle, the electronics typically will delay sending additional signals for a period of time equal to or exceeding the period O–Q. Subsequently, and until the key is released, the value of the capacitive signal will be converted by the electronics to a digital signal representative of and proportional to the force with which the key is held down ("pressure"); this signal is regularly forwarded to the sound generator and may be used to continuously vary musical parameters such as volume, vibrato, or other tonal characteristics.

At some time T the key is released, and the capacitance falls in an approximate reversal of the initial rise as the key and the sensor assembly return to their original positions. At some time V during this fall, the capacitance will drop below a preselected release threshhold K and the electronics will generate a signal for the sound generator to turn the note off.

The attack threshhold may be selected by the manufacturer or adjusted by the player to be anywhere from J to approximately J'. The release threshhold can similarly be adjusted anywhere from K to K', with the only restriction being that the release threshhold must remain below the attack threshhold to prevent a situation in which the capacitive value satisfies both the "Note On" and "Note Off" criteria simultaneously. The practical minimum setting for the release threshhold K is the smallest amount above the rest capacitance R which can reliably be differentiated from R. The practical minimum for the attack threshhold J is the minimum release threshhold K plus some minimum differential between K and J. The practical maximum attack threshhold J' is slightly above D, the point at which the deformable projections 11 and 11' are all in contact with the dielectric 15, as shown in FIG. 2D; at this level of J' some slight amount of momentum is required to trigger the note. The practical maximum release threshhold K' is slightly below D, insuring that as long as the key is down against the keybed, the note will stay on.

The ability to adjust attack and release threshholds is useful. Adjusting the release threshhold K, FIG. 3C, changes the point in the key's upward travel at which the note turns off, and thus establishes how far a key must return before a new note can be struck. The low release threshhold K requires that the key return two-thirds or more of the way to its rest position before the note can be struck again, mimicking the behavior of a common upright piano action or most typical dual-switch electronic keyboards. The higher release threshhold K', however, requires that the key be lifted only a small amount of the way to its rest position before the note can be restruck, mimicking the action of a well-adjusted grand piano. Adjustable release threshholds allow a player to set the keyboard to behave like other familiar keyboards or to adjust its performance for different playing conditions.

Theoretically, a single attack threshhold J' will prevent interference with any of the release threshhold settings K to K', but there can be other more subtle reasons to adjust the attack threshhold. For instance, it is clear that when the attack threshhold is J, the time 0 minus N between crossing the attack threshhold and reaching a peak capacitance P greatly exceeds the time O minus N', which is the equivalent period for attack threshhold J'. Lower attack threshholds may be advantageous under certain circumstances for this reason.

FIG. 4 shows a cutaway isometric view of a series of sensor assemblies, and illustrates several of the features which increase manufacturability of the system. The deformable electrodes 10 for adjacent keys are made from a single continuous strip of material with the hinge H, bearing surfaces B, and spring sections S (see FIG. 2A) separated to allow independent movement while the two extremities attached by the fasteners 12 remain continuous. The fixed electrodes I3 and their connections 14 are etched on the surface of a printed wiring board 8, as is a single source 16 providing a common AC signal to all the deformable electrodes 10. The dielectric 15 may be an adhesive-backed film tape or it may be silkscreened onto the surface of the printed wiring board after etching. With the deformable electrodes 10 in a series, fewer fasteners 12 are required to locate the strip, position it, and make the electrical contact than if the electrodes were separate. The assembly shown may be constructed, tested, and stored completely independent of the keyboard. Similar rows or arrays of capacitors may be constructed for actuation by other mechanisms such as alphanumeric computer keyboards.

Referring back to FIG. 1C, the use of triangular and hemicylindrical ridges for deformable projections 11 and 11' as opposed to discrete cones and domes is not necessary for this type of sensor; however, it results in certain advantages both in design and in manufacturability. First, ridges allow controlled flexibility of the deformable electrode 10 along a specific axis. Referring again to FIG. 4, the deformable electrodes 10 are relatively rigid along the X-axis while being selectively flexible along the Y-axis. This assists the use of variable length projections 11 and 11' by allowing the flexing of the deformable electrode 10 shown in FIG. 2D, for instance, and contributes to consistency from sensor assembly to sensor assembly. Secondly, referring again to FIG. 4, the ridges distribute force along the X-axis; this contributes, along with the increased contact area of a ridge relative to a discrete dome or cone, to enabling large forces to be transduced with a relatively small amount of vertical travel. From a manufacturability standpoint, the ridges allow the deformable electrodes 10 to be manufactured in strips using continuous manufacturing processes such as extrusion, which can reduce costs of the parts while improving consistency compared to alternate methods such as molding. Lastly, ridges can compensate for tolerances in positioning the sensor assemblies relative to the actuator assemblies along the X-axis, as long as the actuator is narrower than both the deformable electrodes 10 and the fixed electrodes 11.

Figure 5A:
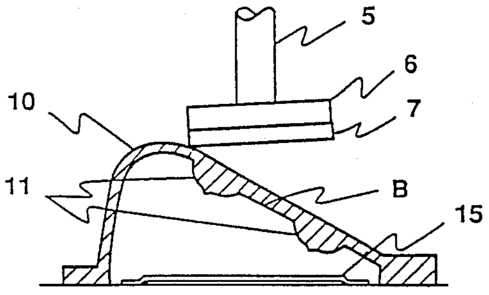

The relationship between the amount of capacitance change during key depression and the amount of capacitance change after contact can also be adjusted by varying the number of deformable projections, their cross-sectional shapes, and their placement relative to both the actuator and the fixed electrode. FIG. 5A shows a deformable electrode 10 which has two identical deformable projections 11 and a thickened bearing section B relative to the other moveable parts of the electrode to insure that the deformable projections 11 work as a unit. The two deformable electrodes 11 are hemicylindrical ridges surmounted by relatively small triangular ridges which limit the area in contact with the dielectric 15 until significant force is applied by the player. This system is designed to accommodate a large actuator 5, 6, 7 which bears on both deformable projections when down. This capacitor assembly produces a basic two-projection capacitance versus displacement curve such as that shown in FIG. 3C, with a relatively high E/R ratio and relatively low value for D.

Figure 5B:
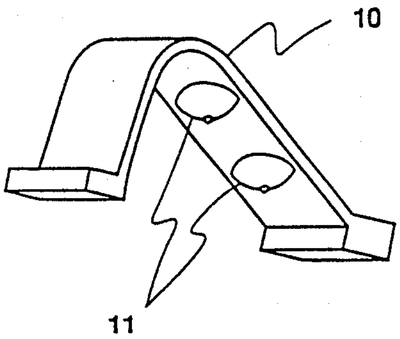

FIG. 5B shows a similar sensor assembly, except that the deformable projections 11 are domes surmounted by small conical projections rather than the modified hemicylindrical ridges. This system will also produce an output similar to the basic two-projection curve, FIG. 3B, but with even lower values at point E and at line D because of the small contact area produced by the conical projections atop the domes. The curve in the pressure region, the portion of the curve beyond line D and point M, will be steeper than that shown, since dome shapes produce greater proportional increase in area in contact with the dielectric 15 for a given force than do hemicylindrical ridges.

Figure 5C:
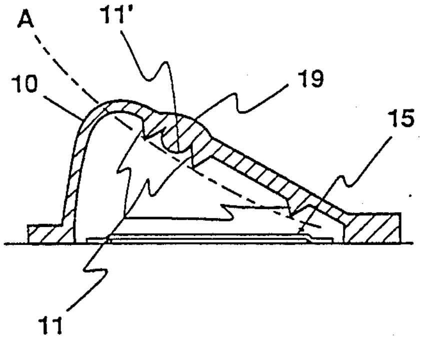

FIG. 5C shows a deformable electrode 10 with three triangular ridged deformable projections 11 and one hemicylindrical ridge 11'. Two functional modifications are incorporated into this design. First, the hemicylindrical projection 11' does not extend all the way to the arc A which establishes the length of the triangular projections 11. Also, on the upper side of the deformable electrode 10, opposite the hemicylindrical projection 11', is a rounded ridge 19. The effect of these two modifications is that when the deformable electrode 10 is all the way down so that the deformable triangular projections 11 are in contact with the dielectric 15, corresponding to the position shown in FIG. 2D, the hemicylindrical projection 11' will remain at some distance above the dielectric 15. When further downward force is applied, it will be preferentially directed by the rounded projection 19 toward moving the hemicylindrical projection 11' into contact with the dielectric 15. The result is a system in which the triangular ridges 11 are responsible for the bulk of the capacitance increase during the key's downward movement and immediately after the deformable electrode 10 comes in "full" contact with the dielectric 15; however, after a certain threshhold of downward pressure on the key is exceeded, the bulk of the further capacitance increase results from the contact and compression of the hemicylindrical ridge 11'.

Figure 5D:
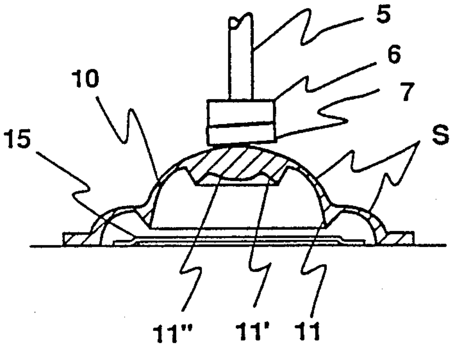
Figure 5E:
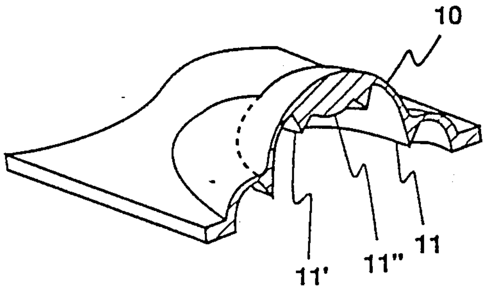

FIGS. 5D and 5E show a geometrically different but functionally similar sensor design to that in FIG. 5C. In this case, the arcuate deformable electrode 10 is round instead of flat, and the deformable projections 11, 11' and 11'' are concentric rather than parallel. The spring sections S are integrated into the design. When the actuator assembly 5, 6, 7 presses down on the deformable electrode 10, the projection 11 contacts the dielectric first. As key depression continues, the projections 11' and 11'' continue to approach the dielectric 15 until projection 11' makes contact, the position corresponding to that shown in FIG. 2D. Continued pressure on the key will bring the dome-shaped deformable projection 11'' into contact with the dielectric 15, then will compress it, resulting in the increase in area required to transduce key "velocity" and pressure. This design is more sensitive to position relative to the actuator than most of those described previously, and provides a less linear displacement signal than many, but could be useful for a high volume design with limited threshhold adjustability.

The "force threshhold" effect which is provided in greater or lesser degree by the designs shown in FIGS. 5A–E has functional significance for keyboard design. When a key is held down to maintain a continuous note, the force with which it is held down exceeds the force required to depress it. For this reason, the functional "down" capacitance will be higher than that shown as D in FIGS. 3A–D, and the proportion of the signal thus available to transduce pressure will in fact be some amount less than that shown as the portion of the curve D to M. For that reason, it may be useful to have a sensor design in which some amount of pressure greater than that required for key depression is required to engage the projection or projections which are intended to transduce pressure.

Figure 5F:
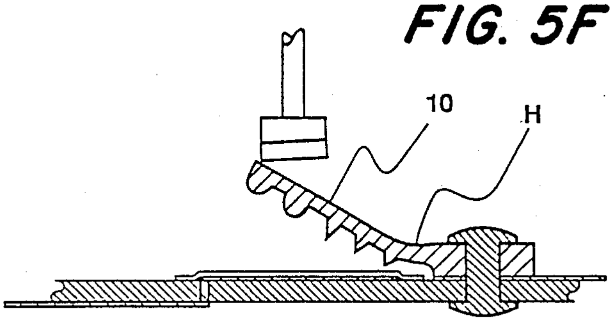
Figure 5G:
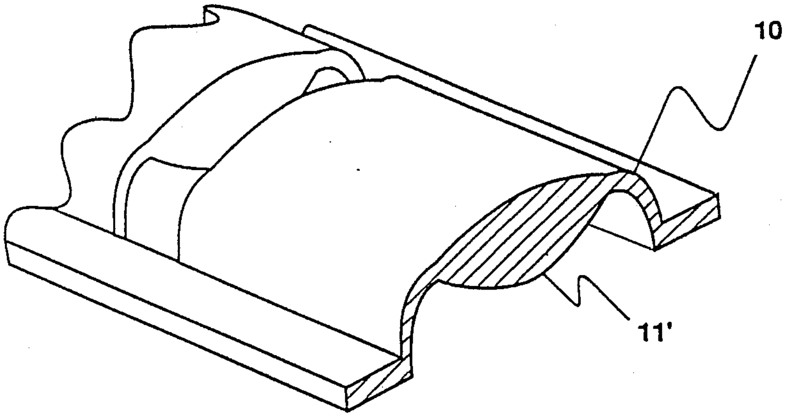
Figure 5H:
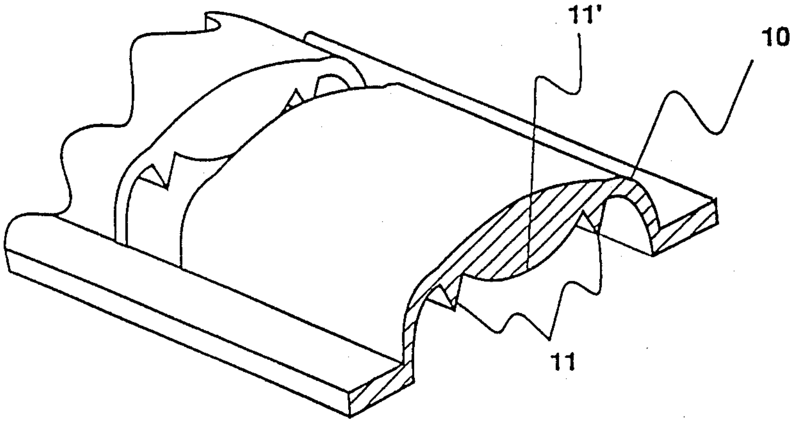

FIGS. 5F–H illustrate several other sensor configurations for special applications. FIG. 5F shows a sensor similar to that shown in FIG. 2A, but with the hinge section H reinforced to provide adequate spring return force without the use of the additional spring section S provided by the full arch. Such a design would require less conductive rubber, and might be useful for a system with less stringent performance requirements, and one which could tolerate the greater oscillation of the sensor upon release.

FIG. 5G shows a system in which the arcuate arch shape is used with a single deformable projection to provide an impact and pressure sensor with minimal travel and little displacement measurement capability. Such a system would have a capacitive output of the general form shown in FIG. 3A but, because of the arch shape and integral spring sections S, would have a low resting capacitance R and the manufacturability advantages of the sensor system shown in FIG. 4, and could be used under piano keys or in front of piano hammers.

FIG. 5H shows a system similar to that in FIG. 5G, but which has deformable triangular ridges 11 flanking the hemicylindrical projection 11'. By adjusting the length of the triangular ridges 11, such a system could incorporate a threshhold effect or, if the triangular ridges 11 were at the same height as the hemicylindrical projection 11', could provide stability and consistency to the sensor under conditions where the force applied was not perpendicular to the support surface.

It is also possible to adjust the rate and amount of capacitance change during key depression for a given deformable electrode design by varying the shape of the fixed electrode, as is shown in FIGS. 6A–C. FIG. 6A shows a simple rectangular fixed electrode 13, as was depicted in FIG. 4; the dotted lines Z and Z' show the points of contact of the deformable electrodes 11 and 11', FIG. 1B. FIG. 6B shows a different design in which the deformable electrodes 11 contact a narrower width section of the rigid fixed electrode 13, reducing the area of contact of the deformable projections 11 and depressing the initial stages of the capacitance curve shown in FIG. 3B. Other similar variations of the fixed electrode design could be used to selectively increase or decrease the capacitance at virtually any point on the curve shown by controlling the percentage of any given deformable projection 11 or 11', FIG. 1B, which contributes to the area of contact with the dielectric 15.

FIG. 6C shows a variable surface area electrode which could be used with the round deformable electrode design shown in FIGS. 5D–E; the points of contact of the deformable projections 11, 11', and 11'' are shown by the dotted lines Z, Z', and Z''. In such a concentric design, the length of the deformable ridges, and thus the potential contact area, increases as the diameter increases, and therefore it may be desirable to vary the contact area of the fixed electrode 13, shown as in radial spokes, to adjust the amount of capacitance increase during depression and contact of the various deformable projections 11, 11' and 11''.

FIGS. 7A & B show another variation of the sensor systems shown in FIGS. 5A and 5E, respectively. In this modification, the amount of conductive elastomer required is minimized by the use of a second, non-conductive material 20 to provide the support structure of the assembly. One advantage to this approach is that the second material 20 may be selected primarily for mechanical properties, such as flexibility and fatigue resistance, which may be superior to that available in conductive elastomers. A second potential advantage is that non-conductive molding materials are generally less expensive than conductive molding materials, and in higher volumes the cost savings may justify the additional tooling expense.

While the present invention has been described in connection with a keyboard for controlling electronic music, those skilled in the art will appreciate that it may have other useful applications as well, wherever variable signals are desired in response to the depression of and the force acting on a key or other similar device or movement. Other additions and modifications may be made in the present invention without departing from the essential spirit, scope, and features of novelty thereof, which are intended to be defined and embraced by the appended claims.

What is claimed is:

1. A capacitive pressure-sensitive and displacement-sensitive sensor apparatus having, in combination, first electrode means comprising a thin resilient conductive inclined or arcuate plastic sheet having a plurality of resilient projections protruding from the inner surface of the sheet and with said projections pressure-deformable by application of pressure thereat from the outer surface of the sheet, a second relatively flat electrode facing and coextensive with the projections and separated from the same by a thin dielectric layer therebetween, the first electrode extending inclinedly or arcuately over the second electrode such that when force is applied to the resilient first electrode along said outer surface thereof, as by a portion of means such as a keyboard key contacting the same, it approaches the second electrode and dielectric layer through air in a fashion which causes the resilient deformable projections along the inclined or arcuate inner surface thereof to contact said dielectric layer sequentially in a predictable order.

2. A capacitive sensor apparatus as claimed in claim 1 and in which the resilient first electrode, upon release of said force, causes the resilient deformable projections to release from said dielectric layer sequentially in a predictable order.

3. A capacitive sensor apparatus as claimed in claim 1 and in which the deformable projections comprise ridges.

4. A capacitive sensor apparatus as claimed in claim 3 and in which said ridges are arranged one of parallelly and concentrically.

5. A capacitive sensor apparatus as claimed in claim 3 and in which the deformable projections comprise ridges flanking hemicylindrical projections.

6. A capacitive sensor apparatus as claimed in claim 1 and in which a portion of the resilient electrode functions as a spring.

7. A capacitive sensor apparatus as claimed in claim 1 and in which said projections include projections of different cross-sectional dimensions and/or geometries.

8. A capacitive sensor apparatus as claimed in claim 1 and in which said key means is provided with a compressible means contacting said outer surface of the sheet such that the "feel" of movement to a player operating said key is divided between compression of the deformable projections and compression of the key compressible means.

9. A capacitive sensor apparatus as claimed in claim 8 and in which means is provided for adjusting the ratio of said compressions to control said "feel".

10. A capacitive sensor apparatus as claimed in claim 1 and in which the deformable projections are in the form of domes surmounted by small conical projections.

11. A capacitive sensor apparatus as claimed in claim 1 and in which the shape of said first electrode surface over an appreciable portion of its extent is substantially flat.

12. A capacitive sensor apparatus as claimed in claim 1 and in which the shape of said first electrode surface over an appreciable portion of its extent is round.

13. A capacitive sensor apparatus as claimed in claim 1 and in which the projections are merged into a single deformable projection.

14. A capacitive sensor apparatus as claimed in claim 1 and in which means is provided for varying the shape of the fixed electrode to vary the rate and amount of capacitance change during key depression.

15. A capacitive sensor apparatus as claimed in claim 14 and in which said shape is one of rectangular narrowing width and radial spoke shapes.

16. A capacitive sensor apparatus as claimed in claim 1 and in which said one electrode comprises conductive deformable projections carried by the inner surface of a non-conductive surface.

17. A method of capacitive displacement and pressure sensing with the aid of a pair of capacitive electrodes one of which is resiliently deformable and inclinedly or arcuately overlies the other to define an air space therebetween with a dielectric layer carried by said other electrode and with the said one electrode comprising resilient conductive projections along its inner surface adjacent said air space, said method comprising applying the displacement and pressure force to a predetermined portion of the outer surface of said one electrode and in the direction toward said other electrode and into said air space therebetween; continuing the application of said force in said direction and air space resiliently to deform said one electrode and depress the incline or arc thereof so that a substantial portion of said one electrode approaches parallelity with said other electrode with the successive projections thereof sequentially compressed in a predetermined order into contact with the dielectric layer of said other electrode; and thereafter releasing said force to permit the compressed projections sequentially to release in inverse order from compressed contact with said other electrode dielectric layer to restore said air space and said one electrode to its original inclined or arcuate position overlying said other electrode.

18. A method as claimed in claim 17 and in which said one electrode is peripherally insulatingly connected to the adjacent edge of said other electrode from which it inclinedly or arcuately extends and about which connection it hingedly is depressed and released relative to said other electrode.

19. A method as claimed in claim 17 and in which said force is applied under the control of the human finger, depressing and releasing a key mechanism bearing upon said predetermined portion of the outer surface of said one electrode.

20. A method as claimed in claim 19 and in which some of said projections are differently geometrically shaped from others to control the feel to the finger of the depressing, the bottoming of the key depression and the release of the same.

21. A method as claimed in claim 20 and in which cushioning is provided on said key mechanism adjacent said predetermined portion of the outer surface of said one electrode further to control said feel as the cushioning is depressed against the depressed said predetermined portion of the outer surface of said one electrode.

* * * * *